Patented May 1, 1945

2,374,923

UNITED STATES PATENT OFFICE 2,374,923

MANUFACTURE OF UNSATURATED HALOGENATED COMPOUNDS

Oliver W. Cass, Niagara Falls, N. Y., assignor to E. I. du Pont de Nemours & Company, Wilmington, Del., a corporation of Delaware No Drawing. Application October 10, 1942, Serial No. 461,635

18 Claims. (Cl. 260—654)

This invention relates to the preparation of unsaturated halogenated hydrocarbons and, more particularly, it is directed to the preparation of polyhalogenated olefines by reacting oxygen and a hydrogen halide with an unsaturated aliphatic halide of lower chlorine content than that of the polyhalogenated product desired.

The preparation of saturated chlorinated hydrocarbons by the addition of hydrogen halides to the double bond of an olefine hydrocarbon, or an olefine halide, has previously been described in the literature. For example, ethyl chloride may be readily prepared by reacting hydrogen chloride with ethylene, or ethylidene dichloride by reacting vinyl chloride and hydrogen chloride. However, it has not heretofore been considered possible to effect substitution halogenation of an olefine, or of a halogenated olefine, by means of hydrogen halides.

One of the objects of this invention is the provision of a new and improved method for the preparation of unsaturated aliphatic halides. Another object of this invention is to provide a method for preparing unsaturated aliphatic halides wherein oxygen, hydrogen halide, and an unsaturated aliphatic halide of lower halogen content are utilized as the starting materials. A further object is the development of a method for the preparation of unsaturated aliphatic halides wherein substitution halogenation products are the predominant compounds resulting, to the substantial exclusion of halogen addition products. These and still further objects and advantages of my invention will be apparent from the ensuing disclosure of certain preferred embodiments thereof.

These objects are attained in accordance with the present invention by reacting an unsaturated aliphatic halide with a hydrogen halide and oxygen in the presence of an oxidation catalyst at a temperature within the range 250–600° C., this process resulting in the predominant production of substitution halogenation products, particularly unsaturated aliphatic halides of higher halogen content than the unsaturated aliphatic halide starting material. Thus, for example, by reacting vinyl chloride with hydrogen chloride and oxygen, I may obtain a product consisting predominantly of trichlorethylene and perchlorethylene. Similarly, by reacting dichlorethylene (either symmetrical dichlorethylene or unsymmetrical dichlorethylene), with hydrogen chloride and oxygen, a substitution reaction product consisting predominantly of trichlorethylene and perchlorethylene results. The reactions which take place may be represented by the following equations:

Vinyl chloride as starting material:

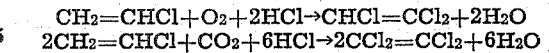

Symmetrical dichlorethylene as starting material:

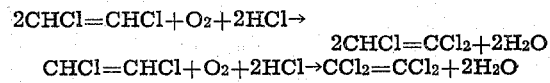

Unsymmetrical dichlorethylene as starting material:

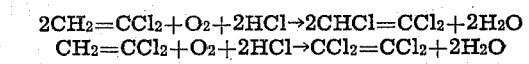

These reactions and similar reactions for other starting materials may be carried out by mixing the unsaturated aliphatic halide starting material with the hydrogen halide and air or oxygen, and passing the mixture over the catalyst in a heated or cooled reaction chamber. If desired, the three constituents may be introduced into the reaction space in separate streams, or the air or oxygen may be introduced into a mixture of the olefine and hydrogen halide. However, the olefine and oxygen should not be permitted to reach reaction temperature in the absence of the hydrogen halide.

The reaction products may be recovered by subjecting the gases leaving the reaction chamber to refrigeration to condense the halogenated olefines. The crude liquid product, after neutralization of free acid present, may then be separated into its various constituents by usual methods of fractional distillation. Instead of refrigeration, other well-understood methods, or combinations of methods, such, for example, as compression and cooling to secure condensation, or scrubbing with various scrubbing liquids, may be utilized to recover the products.

The relative proportions of the reactants used will vary considerably, depending upon the particular unsaturated aliphatic halide starting material employed and the desired final product. For example, as indicated by the equations given above, 2 moles of hydrogen chloride and 1 mole of oxygen are required for converting 1 mole of vinyl chloride to trichlorethylene, whereas 1 mole of hydrogen chloride and ½ mole of oxygen are theoretically required for converting 1 mole of dichlorethylene to trichlorethylene. In practice, of course, not all of the hydrogen halide will be reacted, usually about 5 to 10% of the amount fed into the reaction chamber remaining as free hydrogen halide in the reaction products, while about 90 to 95% of the halogen content of the hydrogen halide is converted to halogenated hydrocarbons.

The use of an oxidation catalyst is essential in order to obtain good yields of unsaturated aliphatic halides. Practically all of the oxidation catalysts known in the art are effective, at least to some degree, in promoting the reaction. In general, I prefer to utilize metals or metal compounds such as oxides and salts. My preferred catalysts are oxides or compounds of copper, iron and bismuth and, in general, the best results are obtained by the use of a copper catalyst which may be in the metallic state, in the form of copper oxide, or a copper salt. Many other metals and their compounds have, however, been found to be effective, among them zinc oxide, barium oxide, alumina, various rare earth oxides, magnesium oxide, manganese oxide, silver oxide, titanium dioxide, lead oxide, bismuth oxide, cobalt oxide, nickel oxide, magnesium sulfate, and molybdenum dioxide.

Preferably the catalysts are deposited on refractory supports such as pumice, silica gel, alumina gel, fire brick, porcelain or the like. Such supported catalysts may readily be prepared by saturating a porous refractory material with a solution of the metal salt or metal compound. If the metal compound used is readily converted to the oxide under the conditions of the reaction, it is simply necessary to dry the saturated catalyst support and it is then ready for use. In other cases it may be preferable first to reduce the metal compound on the support to the metallic form which may then be oxidized, preferably by heating the catalyst in an atmosphere of air or oxygen prior to use. The various methods known for preparing catalysts in accordance with these principles may be utilized in practicing my invention. I have obtained excellent results in a large number of reactions by saturating fire brick with solutions of copper salts such as the sulfate, nitrate or chloride.

In carrying out the reaction between an unsaturated aliphatic halide, a hydrogen halide, and oxygen, either as oxygen gas or in the form of air, I prefer to utilize a temperature within the range 250 to 600° C. Generally best results will be secured by operating in the range, 400 to 500° C. when the hydrogen halide is hydrogen chloride, and 250 to 350° C. when the hydrogen halide is hydrogen bromide.

The following examples are given as illustrating the principles of the invention, it being understood, however, that the invention is not limited to these specific preferred embodiments.

*Example I*

10.3 moles of vinyl chloride, 20.9 moles of hydrogen chloride, and 15.5 moles of oxygen (as air) was passed over a catalyst consisting of copper oxide supported on fire brick. The mixture was first preheated to a temperature of 200–220° C., and then passed into the reaction chamber in contact with the copper oxide catalyst at a temperature of 400–460° C.

The effluent gas mixture coming out of the reaction chamber was condensed and fractionated to recover the products. These consisted of 0.89 mole of dichlorethylene, 2.12 moles of trichlorethylene, and 3.35 moles of perchlorethylene. There was present 1.38 moles of unused hydrogen chloride gas. There was no unreacted vinyl chloride present. The dichlorethylene could be subjected to subsequent recycling and chlorination to convert it to higher polychlorinated products.

*Example II*

10.31 moles of unsymmetrical dichlorethylene, 10.03 moles of hydrogen chloride, and 5.03 moles of oxygen (as air) were passed over a catalyst consisting of copper oxide supported on fire brick. The reaction was carried out at a temperature of 365–425° C. The reaction mixture contained 1.26 moles of unreacted dichlorethylene, and 1.62 moles of unused hydrogen chloride. The higher polychlorinated products consisted of 7.32 moles of trichlorethylene and 0.56 mole of perchlorethylene.

*Example III*

17.5 moles of symmetrical dichlorethylene, 18.5 moles of hydrogen chloride, and 8.9 moles of oxygen (as air) were passed over a catalyst consisting of copper oxide supported on fire brick. The reaction was carried out at a temperature of 350–425° C. The reaction mixture contained 5.51 moles of unreacted dichlorethylene, 8.51 moles of trichlorethylene, 1.68 moles of perchlorethylene, and 0.59 mole of unused hydrogen chloride.

While in the foregoing description of the invention reference has been particularly made to unsaturated aliphatic halides derived from ethylene, the invention is not restricted to the use of such halides as it is applicable to the halogenation of halogenated olefinic hydrocarbons generally. Thus, when allyl chloride is reacted with oxygen and hydrogen chloride under similar conditions various higher chlorinated propylenes are obtained as the principal products. When 2-chloro-butene-2 is reacted with oxygen and hydrogen chloride, the resulting product consists predominantly of polychlorobutylenes. Similarly, vinyl bromide reacted with air and hydrogen bromide, under the conditions of my process, results in a high yield of polybrominated ethylenes.

As the reaction may be carried out either with hydrogen chloride, or with hydrogen bromide (to prepare the corresponding brominated olefines), in the appended claims I refer to a hydrogen halide having a molecular weight between 36 and 81, thus including hydrogen chloride and hydrogen bromide.

It should be understood that the invention is not confined to the specific embodiments herein described as illustrative of preferred procedures, but includes all variations, modifications and equivalents not departing from the scope of the invention and falling within the scope of the appended claims.

I claim:

1. The method of effecting substitution halogenation of an unsaturated aliphatic halide containing from 2 to 4 carbon atoms which comprises reacting the same with a hydrogen halide having a molecular weight between 36 and 81 and oxygen in the presence of an oxidation catalyst at a temperature within the range 250 to 600° C.

2. The method of effecting substitution chlorination of a halogenated olefinic hydrocarbon containing from 2 to 4 carbon atoms which comprises reacting the same with hydrogen chloride and oxygen in the presence of an oxidation catalyst at a temperature of 250 to 600° C.

3. The method of effecting substitution chlorination of a halogenated olefinic hydrocarbon containing from 2 to 4 carbon atoms which comprises reacting the same with hydrogen chloride and oxygen in the presence of a catalyst comprising essentially a metal oxide at a temperature within the range 250 to 600° C.

4. The method of effecting substitution chlorination of a halogenated olefinic hydrocarbon containing from 2 to 4 carbon atoms which comprises reacting the same with hydrogen chloride and oxygen in the presence of a copper compound as a catalyst at a temperature within the range 250 to 600° C.

5. The method of effecting substitution chlorination of a halogenated olefinic hydrocarbon containing from 2 to 4 carbon atoms which comprises reacting the same with hydrogen chloride and oxygen in the presence of a copper compound as a catalyst at a temperature of 400 to 460° C.

6. The method of effecting substitution halogenation of vinyl chloride which comprises reacting the same with a hydrogen halide having a molecular weight between 36 and 81 and oxygen in the presence of an oxidation catalyst at a temperature of 250 to 600° C.

7. The method of effecting substitution chlorination of vinyl chloride which comprises reacting the same with hydrogen chloride and oxygen in the presence of an oxidation catalyst at a temperature of 250 to 600° C.

8. The method of effecting substitution chlorination of vinyl chloride which comprises reacting the same with hydrogen chloride and oxygen in the presence of a copper compound as a catalyst at a temperature of 250 to 600° C.

9. The method of effecting substitution chlorination of vinyl chloride which comprises reacting the same with hydrogen chloride and oxygen in the presence of a copper compound as a catalyst at a temperature of 375 to 425° C.

10. The method of effecting substitution halogenation of a halogenated olefinic hydrocarbon containing from 2 to 4 carbon atoms which comprises reacting the same with a hydrogen halide having a molecular weight between 36 and 81 and oxygen in the presence of a catalyst comprising essentially a metal oxide at a temperature of 250 to 600° C.

11. The method of effecting substitution halogenation of a halogenated olefinic hydrocarbon containing from 2 to 4 carbon atoms which comprises reacting the same with a hydrogen halide having a molecular weight between 36 and 81 and oxygen in the presence of a copper compound as a catalyst at a temperature of 250 to 600° C.

12. The method of effecting substitution halogenation of a halogenated olefinic hydrocarbon containing from 2 to 4 carbon atoms which comprises reacting the same with a hydrogen halide having a molecular weight between 36 and 81 and oxygen in the presence of a copper compound as a catalyst at a temperature within the range 400 to 460° C.

13. The method of effecting substitution halogenation of dichlorethylene which comprises reacting the same with a hydrogen halide having a molecular weight between 36 and 81 and oxygen in the presence of an oxidation catalyst at a temperature of 250 to 600° C.

14. The method of effecting substitution chlorination of dichlorethylene which comprises reacting the same with hydrogen chloride and oxygen in the presence of an oxidation catalyst at a temperature within the range 250 to 600° C.

15. The method of effecting substitution chlorination of dichlorethylene which comprises reacting the same with hydrogen chloride and oxygen in the presence of a copper compound as a catalyst at a temperature within the range 250 to 600° C.

16. The method of effecting substitution halogenation of trichlorethylene which comprises reacting the same with a hydrogen halide having a molecular weight between 36 and 81 and oxygen in the presence of an oxidation catalyst at a temperature within the range 250 to 600° C.

17. The method of effecting substitution chlorination of trichlorethylene which comprises reacting the same with hydrogen chloride and oxygen in the presence of an oxidation catalyst at a temperature within the range 250 to 600° C.

18. The method of effecting substitution chlorination of trichlorethylene which comprises reacting the same with hydrogen chloride and oxygen in the presence of a copper compound as a catalyst at a temperature within the range 250 to 600° C.

OLIVER W. CASS.